(12) United States Patent
You et al.

(10) Patent No.: US 7,672,037 B2
(45) Date of Patent: Mar. 2, 2010

(54) ELECTROPHORETIC DISPLAY DEVICE AND MANUFACTURING METHOD THEREOF

(75) Inventors: In Kyu You, Daejeon (KR); Seung Youl Kang, Daejeon (KR); Chul Am Kim, Seoul (KR); Seong Deok Ahn, Daejeon (KR); Gi Heon Kim, Daejeon (KR); Ji Young Oh, Daejeon (KR); Kyung Soo Suh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 95 days.

(21) Appl. No.: 11/977,514

(22) Filed: Oct. 25, 2007

(65) Prior Publication Data

US 2008/0123177 A1    May 29, 2008

(30) Foreign Application Priority Data

Dec. 7, 2006    (KR) .................. 10-2006-0123976

(51) Int. Cl.
*G02B 26/00* (2006.01)
*G03G 17/04* (2006.01)

(52) U.S. Cl. ......................... 359/296; 430/32
(58) Field of Classification Search ................. 359/296; 345/107; 430/32; 204/600
See application file for complete search history.

(56) References Cited

U.S. PATENT DOCUMENTS

| 4,272,596 | A | 6/1981 | Harbour et al. |
| 6,262,706 | B1 | 7/2001 | Albert et al. |
| 6,549,327 | B2 | 4/2003 | Foucher et al. |
| 7,352,354 | B2* | 4/2008 | Ishige .................. 345/107 |
| 2006/0071819 | A1* | 4/2006 | Johnson et al. .......... 341/15 |
| 2008/0042940 | A1* | 2/2008 | Hasegawa .............. 345/76 |

FOREIGN PATENT DOCUMENTS

| JP | 2001-270673 | 9/2003 |
| KR | 10-2004-0030815 | 4/2004 |
| KR | 1020060018506 | 3/2006 |
| KR | 10-2006-0067103 | 6/2006 |
| KR | 1020060067009 | 6/2006 |

OTHER PUBLICATIONS

"Complete electrical and optical simulation of electronic paper" by Tom Bert, et al.; www.sciencedirect.com; Displays 27 (2006) 50-55.

* cited by examiner

*Primary Examiner*—William C Choi
(74) *Attorney, Agent, or Firm*—Blakely, Sokoloff, Taylor & Zafman

(57) ABSTRACT

Provided are an electrophoretic display device and a manufacturing method thereof, and more specifically, electrophoretic e-paper to which a high-k dielectric material is applied in order to improve a reaction rate. The electrophoretic display device of the present invention comprises a plurality of capsules comprising a dielectric fluid and at least one type of particles individually operating in response to an applied electric field and suspended in the dielectric fluid; first and second substrates respectively formed on and below the capsules and having electrodes formed thereon; and a dielectric layer formed on at least one of the first and second substrates to be in contact with the capsules.

4 Claims, 7 Drawing Sheets

ELECTROPHORETIC DISPLAY DEVICE AND MANUFACTURING METHOD THEREOF

CROSS-REFERENCE TO RELATED APPLICATION

This application claims priority to and the benefit of Korean Patent Application No. 2006-123976, filed on Dec. 7, 2006, the disclosure of which is incorporated herein by reference in its entirety.

BACKGROUND

1. Field of the Invention

The present invention relates to an electrophoretic display device and a manufacturing method thereof, and more particularly, to an electrophoretic display device for improving a reaction rate by forming a high-k dielectric layer using a high-k dielectric material in a conventional electrophoretic display device.

The present invention has been produced from the work supported by the IT R&D program of MIC (Ministry of Information and Communication)/IITA (Institute for Information Technology Advancement) [2005-S070-02, Flexible Display] in Korea.

2. Discussion of Related Art

Development of E-paper, one type of display device, began in the mid-1990s and research continues today in laboratories all over the world. E-paper has numerous applications, such as electronic newspaper, mobile compact displays, attachable displays, and displays for advertising. Electronic newspaper and electronic books are seen as being among the most promising applications, and it is anticipated that flexible electronic newspaper and a household electronic frame may be subject to priority development.

E-paper may be implemented using electrophoresis, the movement of charged particles in an applied electric field. When electrophoresis occurs in a fluid containing charged particles, the charged particles move with a velocity determined largely by their charge, viscous drag, the dielectric properties of the fluid, and the magnitude of the applied electric field.

An electrophoretic display device is bistable, and thus its color state persists even after an applied electric field is removed. The first electrophoretic reflective display device having this advantage was developed by Ota in the early 1970's (I. Ota, J. Ohnishi, and M. Yoshiyama, Proc. IEEE 61, p. 832, 1973), and research into such devices has been widespread ever since.

E-paper, one type of conventional electrophoretic display device, will be described below with reference to the accompanying drawings.

Figure 1:
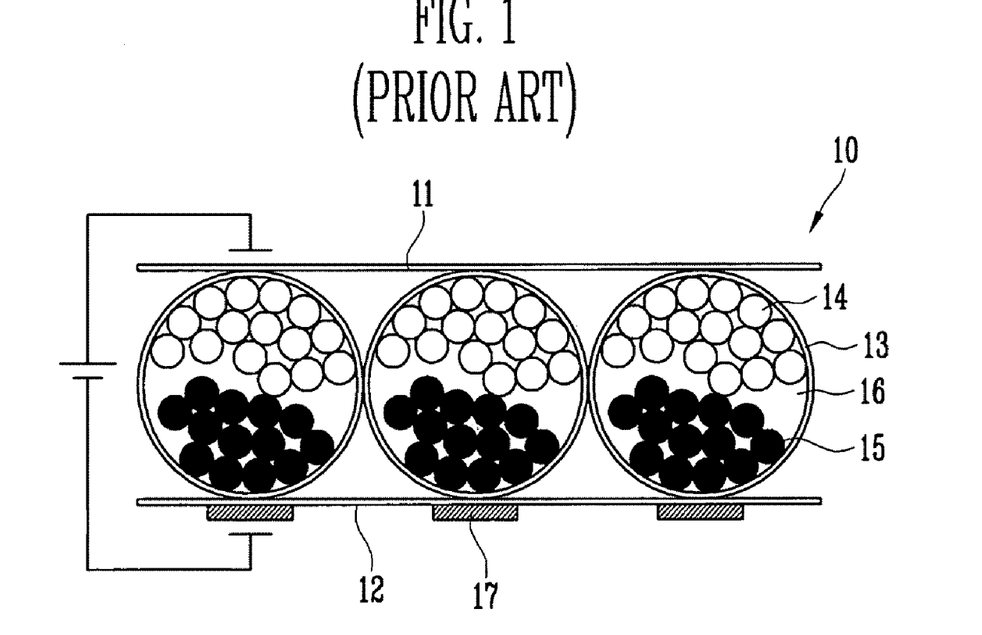
FIG. 1 schematically illustrates e-paper, one type of conventional electrophoretic display device, using two types of particles.
Figure 2:
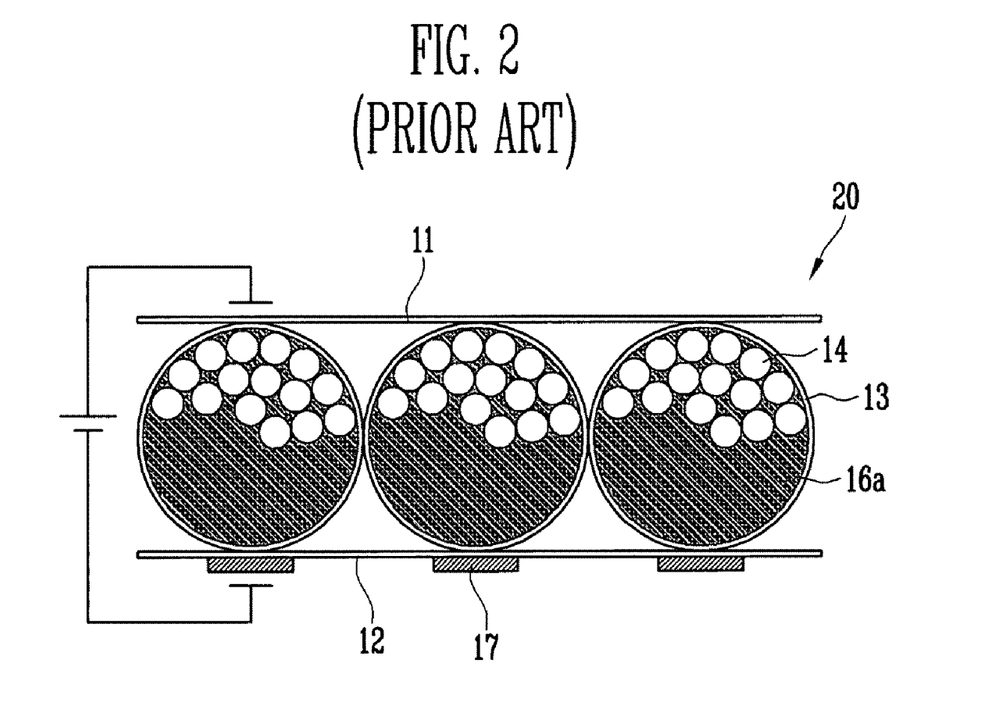
FIG. 2 schematically illustrates e-paper, one type of conventional electrophoretic display device, using one type of particles.

FIG. 1 schematically illustrates e-paper using two types of particles, and FIG. 2 schematically illustrates e-paper using one type of particles.

Referring to FIG. 1, conventional electrophoretic e-paper 10 includes first and second substrates 11 and 12 spaced from each other by a predetermined distance, and a plurality of capsules 13 formed between the first and second substrates 11 and 12. An electrode is formed on each of the first and second substrates 11 and 12, and while an electrode formed on the first substrate 11 is not shown in FIG. 1, an electrode 17 is formed on the second substrate 12 to correspond to each capsule 13. The capsules 13 include a fluid, i.e., a dielectric fluid 16 that fills the inside of the capsule 13, and first and second particles 14 and 15 that are suspended in the dielectric fluid 16 and have different colors from the fluid. Here, the first particles 14 are titanium oxide particles, and the second particles 15 are colored particles.

Referring to FIG. 2, e-paper 20 includes first and second substrates 11 and 12, and a plurality of capsules 13 formed therebetween, like the e-paper 10 illustrated in FIG. 1. The capsules 13 illustrated in FIG. 2 include a colorant solution 16a as the dielectric fluid, and first particles 14 formed of titanium oxide. Other components are the same as in FIG. 1, and thus a detailed description thereof will be omitted.

The electrophoretic e-paper shown in FIG. 1 has a structure in which two types of particles having different colors and the dielectric fluid are included in the capsules 13, and the electrophoretic e-paper shown in FIG. 2 has a structure in which one type of particles and a colorant solution are included in the capsules 13. In both cases, the color of the paper is determined by the particles included in the capsules 13. When an electric field is applied to particles having one or more colors, oppositely charged particles move towards oppositely charged electrodes, causing a visually observable change in color.

However, when electrophoretic e-paper is manufactured, the densities of the charged particles and the dielectric fluid are made the same to prevent the charged particles from settling on the bottom. However, clustering and agglomeration of particles occurs over time due to dispersion instability and eventually leads to particle instability. This poses an obstacle to commercialization (refer to P. Murau and B. Singer, J. Appl. Phys., vol. 49, p. 4820, 1978).

In addition, lowering an operating voltage in order to reduce power consumption of the electrophoretic e-paper may excessively weaken the electric field across the capsules because the e-paper structurally includes interfaces and other elements between the capsules, a binder, and the electrodes.

SUMMARY OF THE INVENTION

The present invention is directed to an electrophoretic display device and a manufacturing method thereof, in which a high-k dielectric layer is inserted into a cell of e-paper, an electrophoretic display device, to thereby accelerate a reaction rate through a threshold voltage generated by a dipole that is generated in the high-k dielectric layer.

The present invention is also directed to an electrophoretic display device and a manufacturing method thereof capable of low voltage operation and improving a particle (ink) velocity according to a voltage in a capsule of e-paper, an electrophoretic display device.

One aspect of the present invention provides an electrophoretic display device including: a plurality of capsules comprising a dielectric fluid and at least one type of particles individually operating in response to an applied electric field and suspended in the dielectric fluid; first and second substrates respectively formed on and below the capsules and having electrodes formed thereon; and a dielectric layer formed on at least one of the first and second substrates to be in contact with the capsules.

The dielectric layer may be a high-k dielectric layer formed on the substrate using a spin coater. The high-k dielectric material may include a high-k dielectric organic polymer, or one of PZT[Pb(ZrTi)O$_3$], [Ba,Sr(Zr,Ti)O$_3$], [TiO$_2$], [Ta$_2$O$_3$], and [Al$_2$O$_3$]. The particles may include first particles formed of titanium oxide and second particles having a color. A transparent electrode formed of one of Indium-Tin-Oxide (ITO), Indium-Zinc-Oxide (IZO) and Indium-Tin-Zinc-Oxide (ITZO) may be stacked on at least one of the first and second substrates.

Another aspect of the present invention provides a method of manufacturing an electrophoretic display device including the steps of: preparing first and second substrates including electrodes; injecting a plurality of capsules between the first and second substrates; and forming a dielectric layer in contact with the capsules and formed of a dielectric material on at least one of the first and second substrates, before injecting the capsules between the first and second substrates.

The method may further include the step of performing an ultrasonic cleaning process on the first and second substrates before the dielectric layer is coated on the substrate. The step of coating the dielectric layer may include the steps of coating a dielectric material on the substrate using a spin coater, performing a first heat treatment process on the substrate on which the dielectric material is coated, and performing a second heat treatment process on the substrate, on which the first heat treatment process has been performed, in the air. The dielectric material may include a high-k dielectric organic polymer or one of [Pb(ZrTi)$O_3$], [Ba,Sr(Zr,Ti)$O_3$], [Ti$O_2$], [Ta$_2O_3$], and [Al$_2O_3$].

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Figure 3:
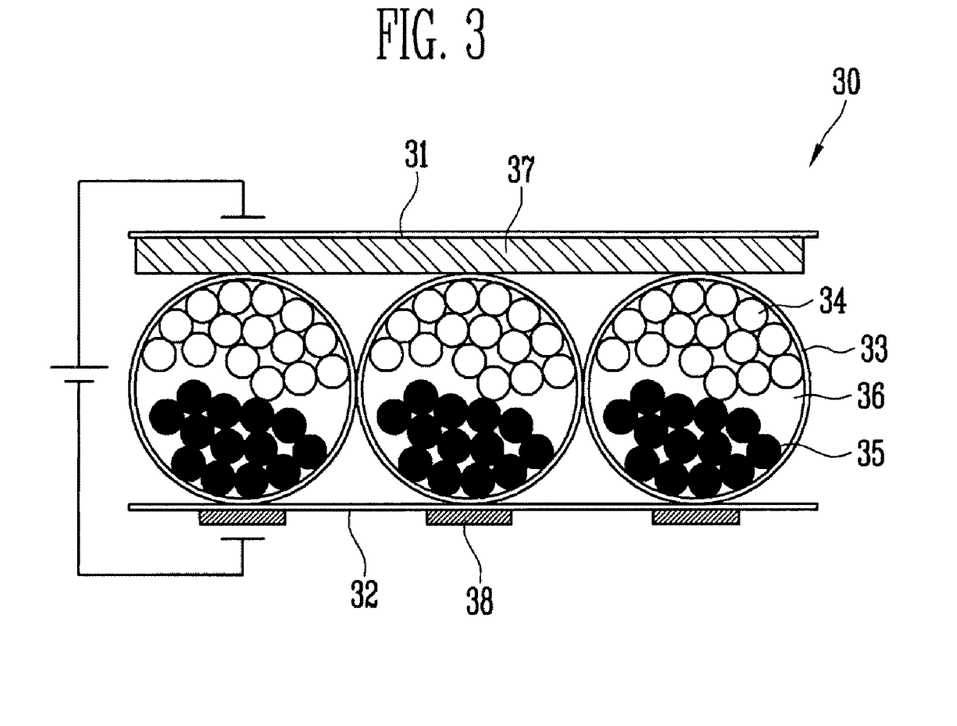
FIG. 3 schematically illustrates e-paper, an electrophoretic display device, according to a first exemplary embodiment of the present invention.

FIG. 3 schematically illustrates e-paper, an electrophoretic display device, according to a first exemplary embodiment of the present invention.

Referring to FIG. 3, electrophoretic e-paper 30 according to a first exemplary embodiment of the present invention includes first and second substrates 31 and 32 spaced apart by a predetermined distance, a plurality of capsules 33 formed between the first and second substrates 31 and 32, a high-k dielectric layer 37 formed on the first substrate 31 to be in contact with the capsules 33, and an electrode 38 formed on a corresponding capsule 33 region of the second substrate 32 to be electrically connected to the capsules 33. The capsules 33 include first and second particles 34 and 35 of different colors, and a fluid (dielectric fluid) 36 in which the first and second particles 34 and 35 are suspended.

Here, the first substrate 31 may be formed of a transparent substrate, and in the present exemplary embodiment, the first substrate 31 may be formed of a glass substrate including an ITO electrode (not shown in the drawings). The ITO electrode formed on the first substrate 31 may be formed to a thickness of 0.3 μm. Also, the first particles 34 included in the capsules 33 are formed of titanium oxide, second particles 35 are colored particles, and the dielectric fluid 36 is a transparent fluid. Meanwhile, when the high-k dielectric layer 37 is formed of an inorganic dielectric material, one of [Pb(ZrTi)$O_3$], [Ba,Sr(Zr,Ti)$O_3$], [Ti$O_2$], [Ta$_2O_3$], and [Al$_2O_3$] is used as the layer.

Figure 4:
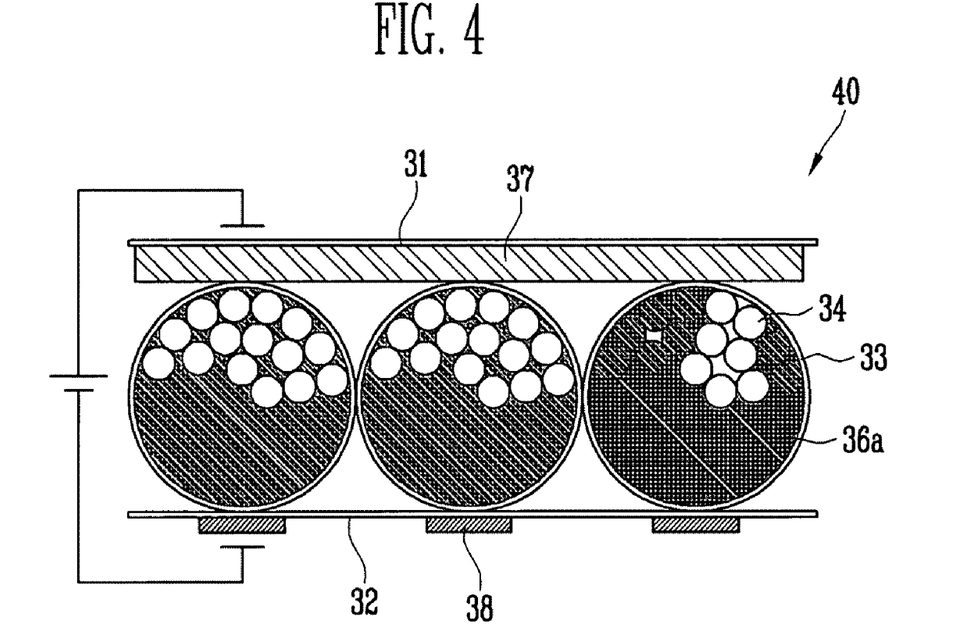
FIG. 4 schematically illustrates electrophoretic e-paper according to a second exemplary embodiment of the present invention.

FIG. 4 schematically illustrates electrophoretic e-paper according to a second exemplary embodiment of the present invention.

Referring to FIG. 4, electrophoretic e-paper 40 includes first and second substrates 31 and 32 spaced apart by a predetermined distance, a plurality of capsules 33 formed between the first and second substrates 31 and 32, a high-k dielectric layer 37 formed on the first substrate 31, and an electrode 38 formed on a corresponding capsule 33 region of the second substrate 32 to be electrically connected to the capsules 33. The capsules 33 include first particles 34 and a colorant solution 36a, in which the first particles 34 are suspended as the dielectric fluid.

Here, the first substrate 31 may be a transparent substrate, and in the present embodiment, is a glass substrate including an Indium-Tin-Oxide (ITO) electrode (not shown in the drawings). The ITO electrode formed on the first substrate 31 may be formed to a thickness of 0.3 μm. Also, the first particles 34 included in the capsules 33 are formed of titanium oxide. Meanwhile, the high-k dielectric layer 37 is formed of an inorganic dielectric material as illustrated in FIG. 3, and one of [Pb(ZrTi)$O_3$],[Ba,Sr(Zr,Ti)$O_3$],[Ti$O_2$],[Ta$_2O_3$], and [Al$_2O_3$] is used as the layer.

Figure 5:
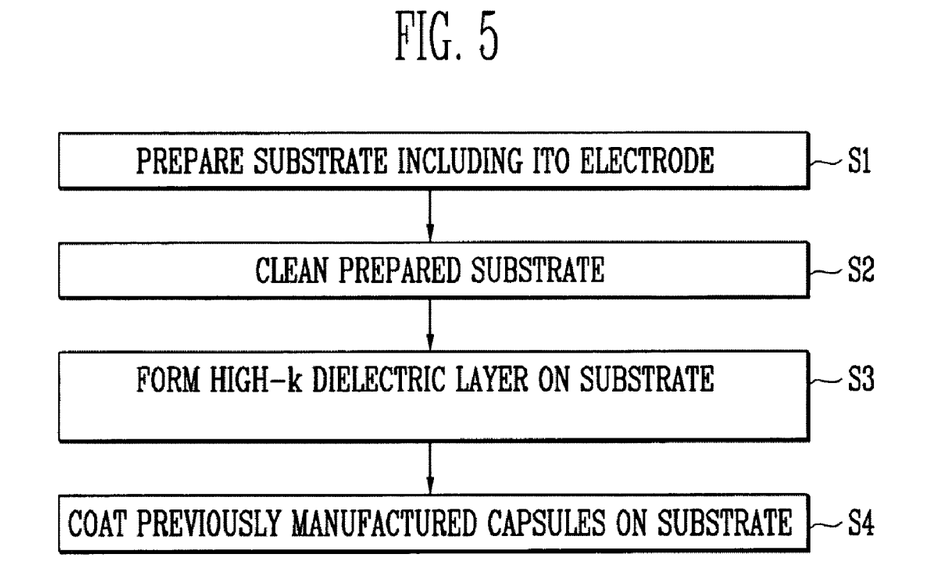
FIG. 5 is a block diagram illustrating a method of manufacturing electrophoretic e-paper illustrated in FIGS. 3 and 4.

FIG. 5 is a block diagram illustrating a method of manufacturing electrophoretic e-paper illustrated in FIGS. 3 and 4. To manufacture e-paper 30 and 40 according to the present invention, first and second substrates 31 and 32 are prepared (S1). Specifically, the first substrate 31 formed of glass and including an ITO electrode formed to a thickness of 0.3 μm is prepared. When the first substrate 31 including the ITO electrode is prepared, a step of cleaning the substrate is performed (S2).

In the step of cleaning the first substrate 31 (S2), ultrasonic cleaning is performed on the substrate in an ultrasonic cleaner with deionized water for one to five minutes. When the ultrasonic cleaning is completed, the glass substrate 31 is dried in an oven at about 110° C. for 10 minutes or longer to remove particles, etc. remaining on the substrate 31.

When cleaning the first substrate 31 is completed, a high-k dielectric layer 37 is formed on the ITO electrode formed on the first substrate 31 using a high-k dielectric material. The high-k dielectric layer 37 used in the present embodiment is formed of an inorganic high-k dielectric material, for example, [Pb(ZrTi)O$_3$], [Ba,Sr(Zr,Ti)O$_3$], [TiO$_2$], [Ta$_2$O$_3$], [Al$_2$O$_3$], etc. To form the high-k dielectric layer 37, a coating step is performed, in which a high-k dielectric PZT[Pb(ZrTi)O$_3$] solution is coated on the first substrate 31 using a spin coater at 3000 rpm for 30 seconds, and a first heat treatment process step is performed, in which the substrate is heated at 250° C. for 10 minutes to thereby remove the solvent. Then, a second heat treatment process step is performed, in which the substrate treated by the first heat treatment process is heated in a furnace at 450° C. for 30 minutes in the air to form the high-k dielectric layer 37.

Previously manufactured capsules 33 (refer to FIGS. 3 and 4) are coated between the first and second substrates 31 and 32, on which the high-k dielectric layer 37 has been coated (S4). The capsules 33 to be coated on the first substrate 31 are manufactured using the following processes.

The capsules 33 including an electrophoretic fluid may be manufactured using a typical liquid emulsion process. In the present embodiment, a coacervation process, which is a liquid-based process, is used as the manufacturing process. Before manufacturing the microcapsules 33 including an electrophoretic dielectric fluid 36, an electrophoretic particle suspension is prepared. To make the electrophoretic particle suspension, 10 g of electrophoretic particles together with 2 g of dispersing agent and 2 g of charge regulator are added to 10 ml of hydrocarbon insulating fluid, and the mixture is suspended by a ball mill to thereby produce a high-concentration suspended particle system. The hydrocarbon insulating fluid is added to the suspended system, so that the total volume of the suspended system is 100 ml. The diluted, suspended system is processed by an ultrasonic homogenizer for 6 hours to produce a stable electrophoretic particle suspension.

Then, to perform a capsule reaction, a double jacket reactor is prepared, a circulation heater raises the temperature of the reaction system up to 40° C., 1000 g of distilled water is injected into the reactor, and 22 g of gelatin is added to the distilled water and dissolved to produce an aqueous gelatin solution. A 60 ml sample taken from the previously manufactured electrophoretic particle suspension is gradually added to a reaction medium, the manufactured aqueous gelatin solution. Then, the reaction medium is maintained at a temperature of 40° C. while the electrophoretic particle suspension is added, and an agitation velocity of the reaction medium is adjusted according to a final particle (drop) size of the electrophoretic particle suspension suspended in the reaction medium.

After agitating for 30 minutes, 600 g of distilled water previously heated to 40° C. is slowly added to the reaction system, and the agitation is continued for 30 minutes. Separately from the process of agitating the reaction system, 16 g of acacia gum is dissolved in 400 g of 40° C. distilled water. An aqueous solution, in which the acacia gum is completely dissolved, is slowly added to the reaction medium, in which the electrophoretic particle suspension is suspended. After adding the acacia aqueous solution, the pH of the reactor is adjusted to 4.9 using a 10% acetic acid solution. After the pH is adjusted, the agitation is continued for 40 minutes while the reactor is maintained at a temperature of 40° C. After 40 minutes, the reactor is set to a temperature of 8° C. while the agitation is continued for 2 hours to cool down the reaction system. After two hours, the cooling process is stopped and 8.35 g of cross-linking agent (e.g., glutaradehyde) is added to the reaction system. After adding the cross-linking agent, operation of a circulating chiller is stopped and the reaction system is left for 24 hours while its temperature gradually rises to room temperature. After agitating for 24 hours, the reaction system is released to separate the microcapsules and properly divide them to be coated. Then, a centrifuge process is performed to separate distilled water from the divided microcapsules. An aqueous binder is added to the resulting microcapsule slurry and mixed to produce a final microcapsule slurry for an electrophoretic display. Here one part aqueous binder is added to ten parts microcapsule slurry. The above processes are sequentially performed to manufacture the capsules used in the present invention.

Figure 6:
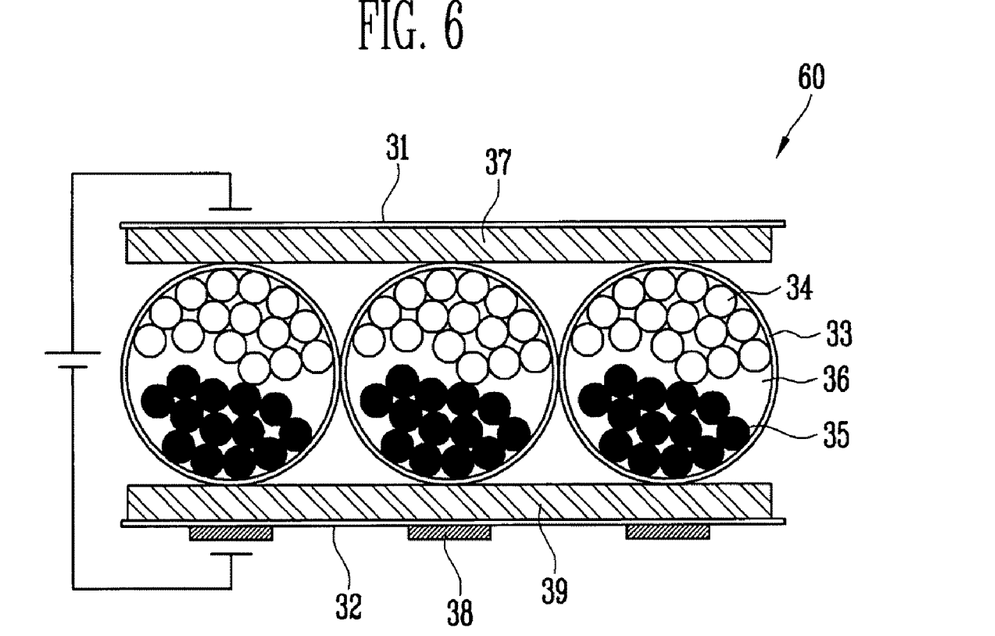
FIG. 6 schematically illustrates electrophoretic e-paper according to a third exemplary embodiment of the present invention.
Figure 7:
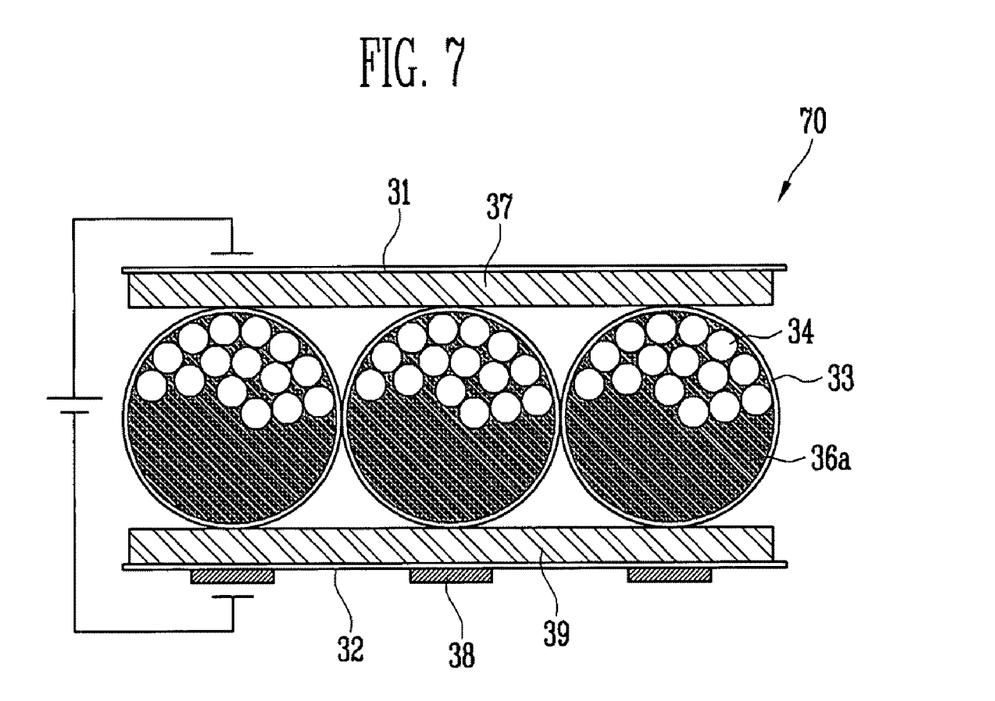
FIG. 7 schematically illustrates electrophoretic e-paper according to a fourth exemplary embodiment of the present invention.

FIG. 6 schematically illustrates electrophoretic e-paper according to a third embodiment of the present invention, and FIG. 7 schematically illustrates electrophoretic e-paper according to a fourth embodiment of the present invention. Referring to FIGS. 6 and 7, electrophoretic e-paper 60 and 70 have the same configurations as those illustrated in FIGS. 3 and 4 except that high-k dielectric layers 37 and 39 formed of a high-k dielectric material are coated on first and second substrates 31 and 32. More specifically, the first substrate 31 including the high-k dielectric layer 37, the second substrate 32 including a high-k dielectric layer 39, and a plurality of capsules 33 formed between the substrates 31 and 32 are illustrated in FIGS. 6 and 7. The capsules 33 manufactured by the above-described processes are used in the present exemplary embodiment. The capsules illustrated in FIG. 6 include first particles 34, second particles 35 having a different color from the first particles 34, and a dielectric fluid 36. The capsules 33 illustrated in FIG. 7 include first particles 34 and a colorant solution 36a. As described above, movement of the particles included in the capsules 33 may be accelerated by the high-k dielectric layers 37 and 39 respectively formed on the first and second substrates 31 and 32.

Figure 8:
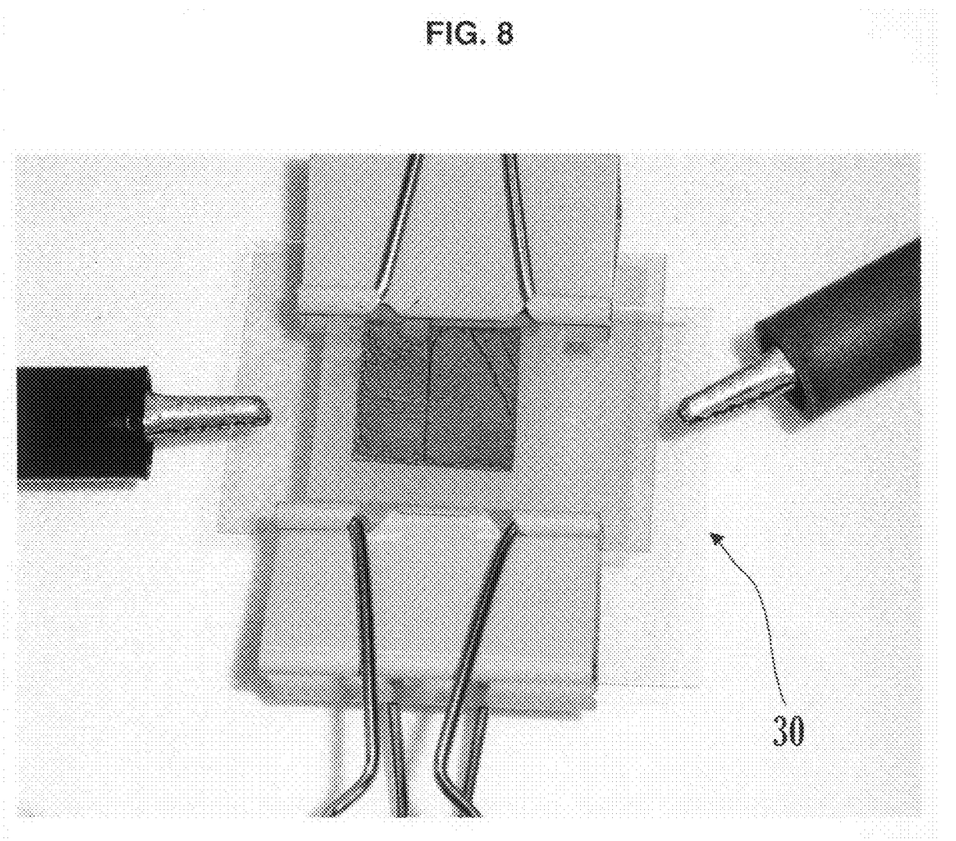
FIGS. 8 and 9 illustrate red and white e-paper manufactured according to an exemplary embodiment of the present invention.
Figure 9:
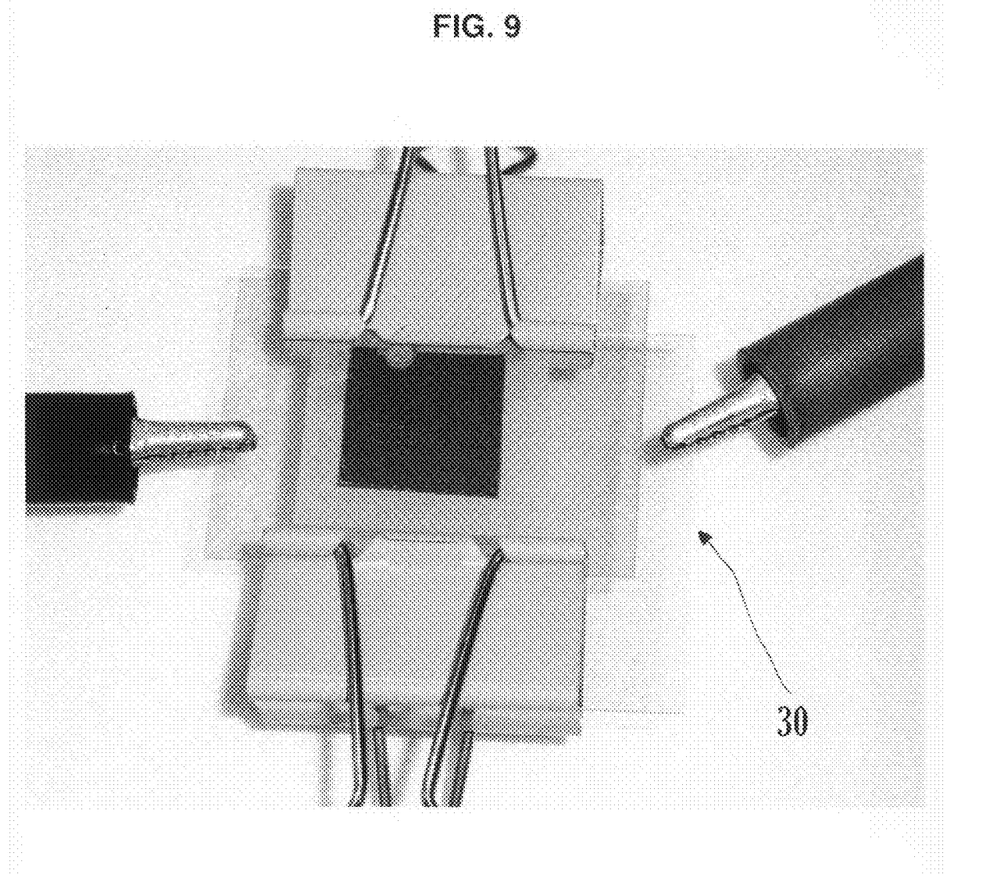

FIGS. 8 and 9 illustrate red and white e-paper manufactured according to the present invention, to which power is applied.

The electrophoretic e-paper 30 according to the present invention has a structure in which two types of particles having different colors and a dielectric fluid are included the capsules 33, or a structure in which one type of particles and a colored dielectric fluid are included in the capsules 33. In both cases, the color is determined depending on the particles included in the capsules 33. That is, when an electric field is applied to particles having one or more colors, charged particles move toward oppositely charged electrodes, causing a visually observable change in color. The e-paper illustrated in FIG. 8 is white and the e-paper illustrated in FIG. 9 is red. Particle velocity may be increased by the high-k dielectric layer formed on each substrate.

Figure 10:
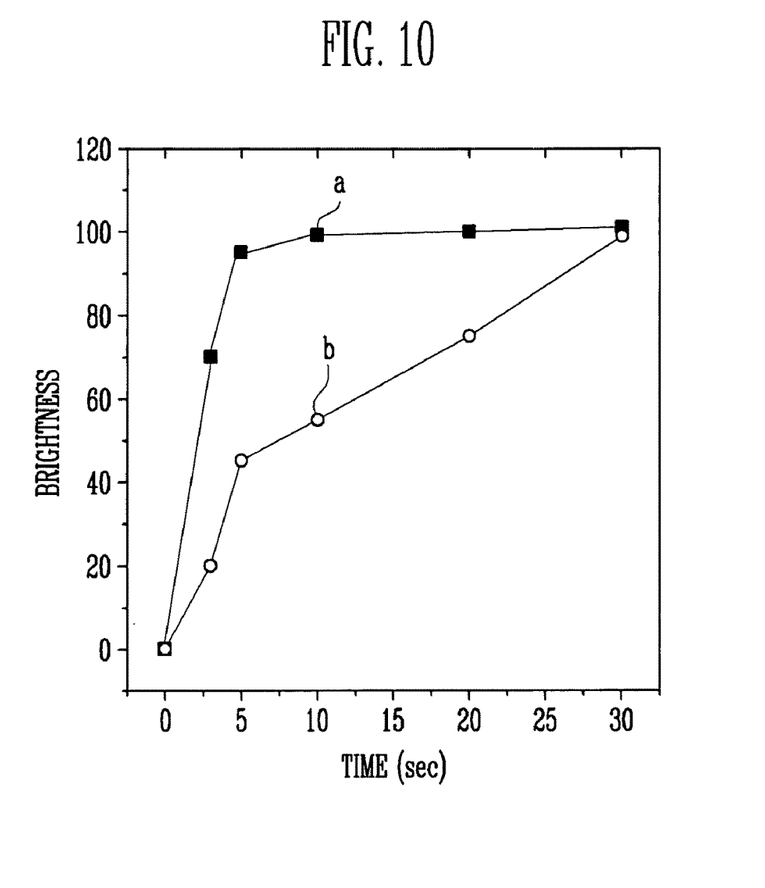
FIG. 10 is a graph illustrating a comparison of e-paper illustrated in FIGS. 8 and 9 and conventional e-paper in terms of contrast rate and velocity data.

FIG. 10 is a graph illustrating a comparison of e-paper implemented by FIGS. 8 and 9 and conventional e-paper in terms of contrast rate and velocity data.

Referring to the graph of FIG. 10, biasing time is plotted on the horizontal axis and relative brightness (cd/m$^2$) is plotted on the vertical axis. Plot (a) corresponds to an exemplary embodiment of the present invention, and plot (b) corresponds to conventional art. As can be seen, in the case of the e-paper of the present invention, no change in brightness is observed for a predetermined time (for 5 seconds). However, in the case of conventional e-paper, brightness rapidly increases over time causing a large, observable deviation in brightness. Also, while the e-paper of the present invention provides constant, maximum brightness after 5 seconds, the conventional e-paper provides the same brightness as the e-paper of the present invention after 30 seconds. Therefore, FIG. 10 shows that the e-paper of the present invention exhibits superior characteristics to the conventional e-paper.

While not described above, e-paper may be formed by coating an organic thin film such as a capsule layer on a high-k dielectric layer to divide an electrode layer in a lattice-shaped pattern, and sealing electrophoretic ink particles with an electrode.

As described above, the present invention is directed to an electrophoretic display device and a manufacturing method thereof having the following effects.

First, a reaction rate of e-paper can be increased by synchronizing particles in capsules of a cell of the e-paper by a threshold voltage due to an internal potential increased by dipoles that are generated in a high-k dielectric layer by forming the high-k dielectric layer on the cell of e-paper. Second, the particle velocity in the e-paper can be doubled compared to conventional e-paper, and its operating voltage can be lowered, by forming the high-k dielectric layer on a substrate. Also, contrast ratio can be improved by forming the e-paper to have the high-k dielectric layer according to the present invention. In addition, the e-paper may induce an internal electric field among ink particles that were partially not charged during their manufacture, enabling the ink particles to move in an applied electric field. Furthermore, the electrophoretic e-paper according to the present invention has improved emission characteristics enabling the display of motion pictures in addition to still pictures.

Exemplary embodiments of the invention are shown in the drawings and described above in specific terms. However, no part of the above disclosure is intended to limit the scope of the overall invention. It will be understood by those of ordinary skill in the art that various changes in form and details may be made to the exemplary embodiments without departing from the spirit and scope of the present invention as defined by the following claims.

What is claimed is:

1. A method of manufacturing an electrophoretic display device comprising:

preparing first and second substrates including electrodes;

injecting a plurality of capsules between the first and second substrates;

forming a dielectric layer formed of a dielectric material on one of the first and second substrates, before injecting the capsules between the first and second substrates, wherein after said injecting the dielectric layer is in contact with the capsules; and performing ultrasonic cleaning on the first and second substrates before coating the dielectric layer.

2. The method of claim 1, wherein the dielectric material comprises a high-k dielectric organic polymer, or one of $PZT[Pb(ZrTi)O_3]$, $[Ba,Sr(Zr,Ti)O_3]$, $[TiO_2]$, $[Ta_2O_3]$, and $[Al_2O_3]$.

3. A method of manufacturing an electrophoretic display device comprising the steps of:

preparing first and second substrates including electrodes;

injecting a plurality of capsules between the first and second substrates;

forming a dielectric layer formed of a dielectric material on one of the first and second substrates, before injecting the capsules between the first and second substrates, wherein after said injecting the dielectric layer is in contact with the capsules; and wherein coating the dielectric layer comprises:

coating a dielectric material using a spin coater;

performing a first heat treatment process on the substrate coated with the dielectric material; and performing a second heat treatment process on the substrate, on which the first heat treatment process has been performed in air.

4. The method of claim 3, wherein the dielectric material comprises a high-k dielectric organic polymer, or one of $PZT[Pb(ZrTi)O_3]$, $[Ba,Sr(Zr,Ti)O_3]$, $[TiO_2]$, $[Ta_2O_3]$, and $[Al_2O_3]$.

* * * * *